United States Patent Office 3,297,780
Patented Jan. 10, 1967

3,297,780
COMPOSITION HAVING HIGH TEAR RESISTANCE COMPRISING RUBBER, POLYOL AND GELATIN
Hendrik J. J. Janssen, Akron, Ohio, assignor to The General Tire & Rubber Company, a corporation of Ohio
No Drawing. Filed Feb. 1, 1962, Ser. No. 170,518
4 Claims. (Cl. 260—747)

This invention relates to rubber products having high tear resistance. It is also concerned with methods for increasing the tear resistance of rubber compositions and to articles made of vulcanized rubber having high resistance against tearing, particularly rubber girdles and similar foundation garments.

There are a number of articles which are made from sheets or other thin sections of rubber which require that the rubber material of which they are formed have as high tear resistance as possible. For example, resistance against tearing by hand is particularly important in stretch girdles and similar foundation garments due to the high tearing stresses imposed upon the garments, particularly when the wearer puts on or takes off the garment.

It has been well known that natural rubber sheets formed from latex have specially good tear resistance, particularly against tearing by hand. This apparently is due, at least in part, to the low degree of breakdown of the rubber of which such sheets are formed and the resulting low permissible concentration of sulfur and vulcanizing agents which lead to a high rate of crystallization on stretching of the rubber sheet.

In view of the high tear resistance possessed by the rubber sheets formed from latex, latex derived rubber products have been manufactured in large numbers. Nevertheless, formation of rubber-latex sheets involves a number of known disadvantages including production and cost problems. Accordingly, it would be advantageous to be able to imitate the high tear resistance of latex-rubber structures in the formation of products from ordinary rubber stock.

A principal object of this invention is the provision of new improvements in the compounding of rubber stock. Further objects include:

(1) The provision of new methods for increasing the tear resistance of rubber compositions.

(2) The provision of rubber compositions which may be vulcanized into sheets having improved tear resistance.

(3) The provision of new vulcanized elastomeric sheets made of vulcanized rubber or other vulcanized elastomers which have high tear resistance, especially against tearing by hand.

(4) The provision of rubber compositions from which foundation garments and similar sheet-like articles of vulcanized rubber may be formed to possess improved tear resistant properties.

Other objects and further scope of applicability of the present invention will become apparent from the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by incorporating in rubber compositions about 15 to 30 parts per 100 parts of rubber of a rubber-immiscible liquid having a boiling point above about 350° F., typically a liquid polyol such as glycol or glycerol. The rubber composition will, of course, be formed in major proportions of an elastomeric diene polymer, such as natural crepe rubber, and the customary proportions of inorganic fillers, vulcanizing agents, antioxidants and the like. The rubber-immiscible liquid is present in the rubber composition in the form of minute discrete droplets uniformly dispersed throughout the composition. Such dispersion of the rubber-immiscible liquid can be attained by suitable mastication and working of the liquid into the rubber composition but, preferably, in accordance with the invention, a dispersing agent is added to the rubber composition along with the rubber-immiscible liquid in order to assist in the uniform and thorough dispersion of the liquid in the rubber stock.

The success of the present invention is due to the fact that the new rubber compositions when formed into sheets and cured, tear in a jagged pattern in contrast to the straighter form of tear normally experienced with standard rubber compositions. The exact explanation for this reticulated tear pattern is not certain, but it appears to be due to the fact that the myriad of tiny droplets break up the continuity of the rubber composition and cause it to tear in the characteristic pattern. In addition to providing greatly improved tear resistance, modification of rubber compositions in accordance with the invention improves mold flow and lessens the compound cost. The slightly higher tensile set and slightly slower curing experienced with such modified compounding are insignificant in comparison with the advantages which are obtained through the use of the new procedures and novel rubber compositions.

A more complete understanding of the new rubber compositions of this invention and the methods for preparing the same may be obtained by reference to the following illustrative example. In this example and throughout the remainder of the specification and claims, all parts or percentages are by weight unless otherwise specified.

A rubber stock composition is formed by mixing together in a Banbury mixer the following ingredients—

| Ingredient: | Parts |
|---|---|
| Natural crepe rubber | 100 |
| Calcium silicate filler | 25 |
| Zinc oxide | 5 |
| Stearic acid | 1 |
| Rubber plasticizer | 1 |
| Paraffin oil | 3 |
| Benzothiazyl disulfide | 0.8 |
| Di-orthotolylquanidine | 0.8 |
| Sulfur | 1 |
| Anti-oxidant | |

One hundred parts of this rubber stock were charged into a Banbury mixer along with 2.2 parts of stearic acid and allowed to mix for about 15 minutes. During this time, a mixture of 16.7 parts of glycerol and 5.6 parts of gelatine were heated to a temperature close to the boiling point while they were vigorously stirred. This heated mixture was then allowed to cool and 0.22 part of concentrated ammonia (36%) was stirred into the cooled mixture forming a whitish paste.

The resulting paste was added to the Banbury mixer containing the admixture of stearic acid and rubber stock and the contents of the mixer were worked until a homogeneous dispersion of minute discrete droplets of the glycerin in the rubber composition was obtained.

The resulting rubber composition was milled and calendered into a thin sheet 0.025 inch in thickness in accordance with known procedures. The sheet was sliced into proper shape for formation of stretch girdles and molded and cured for about six minutes at about 300° F. according to established practice. It was found that the rubber composition cured a little slower than rubber stock not containing the glycerol-gelatine mixture.

Flocking of the sheeted material according to standard practice in formation of stretch girdles was found to proceed satisfactorily. The cured rubber sheets were found to possess very substantially improved tear resistance as compared with rubber sheets made from the base rubber stock as shown by the following table:

| Sheet Stock | A | B |
| --- | --- | --- |
| Base rubber stock | 10 | 6 |
| Glycerol modified stock | 43 | 17 |

In the foregoing table, column A reports the maximum force in pounds required to tear the sheet in accordance with a standard trapezoid tear test on notched test pieces and column B reports the jaw travel of the test device in inches using a jaw travel rate of 20 inches per minute.

The preferred liquids to be used in accordance with this invention for modifying the tear resistance qualities of rubber stocks are glycerol and ethylene glycol. However, the invention contemplates the use of other organic liquids which are immiscible with rubber and which have a boiling point above the normal curing temperatures for the rubber stock, typically above about 300° F. Particularly useful materials within this general class are the liquid polyhydroxyalkanes which, in addition to the two previously mentioned, include diethylene glycol, polyethylene glycol, propylene glycol, octylene glycol and the like. The amount of the rubber-immiscible liquid incorporated in the rubber composition may be varied and will depend to some extent upon the particular liquid employed. Most satisfactory results are obtained using an amount of the liquid between about 15 and 30 parts per 100 parts of the elastomer contained in the total composition.

The invention is particularly applicable to modification of natural crepe rubber. However, the new methods for improving tear resistance of elastomeric compositions can be applied to compositions based upon other elastomeric diene polymers including synthetic rubbers such as polymerized isoprene, polybutadiene, rubbery butadiene-styrene polymers and the like.

The new elastomeric compositions will also contain fillers, vulcanizing agents and other rubber compounding agents normally used in forming base rubber stocks and these additional ingredients will be contained in the customary proportions. Fillers typically employed may include zinc oxide, calcium silica, magnesium carbonate, hard clays, whiting and the like. Typically about 25 to 100 parts of filler per 100 parts of diene polymer will be used. Vulcanizing agents, anti-oxidants, rubber plasticizers and the like may also be present in small amounts typically about 0.5 to 5 parts per 100 parts of the diene polymer with the total quantity of these added materials normally within the range of about 1 to 20 parts per 100 parts of diene polymer.

The rubber-immiscible liquid is incorporated in the elastomeric compositions in accordance with the invention as minute discrete droplets uniformly dispersed throughout the composition. Such dispersion of droplets can be formed by working the base rubber stock together with the rubber-immiscible liquid of masticating mixers, mixing mills or the like. The invention contemplates utilization of dispersing agents in order to promote the uniform dispersion of the rubber-immiscible liquid in the elastomeric compositions. Collagen, typically gelatin, has been found to be useful for this purpose. It also serves the function of stopping lubrication on the mill and calender. A dispersing agent formed in situ from stearic acid and ammonia has also been found particularly effective, but use of other fatty acid soaps or any other dispersing agents which do not adversely effect the curing or stability of the vulcanized rubber and which are effective for promoting dispersion of the rubber-immiscible liquid in rubber are contemplated. Use of about 0.1 to 15 parts of dispersing agent per 100 parts of diene polymer may be used. If a two-phase dispersing agent system comprising gelatin and the fatty acid soap is employed, the collagen will normally be used in about 1 to 10 parts per 100 parts of rubber and the soap in about 0.1 to 5 parts per 100 parts of rubber.

A particularly useful method of incorporating the rubber-immiscible liquid into the rubber stock is illustrated in the foregoing example. Using this type of operation a fatty acid is mixed with the rubber stock and a separate mixture is formed of the rubber-immiscible liquid and a soap forming base such as ammonia is then added to the fatty acid containing rubber stock. The resulting charge is worked in a mixer or on roll mills until uniform dispersion of the liquid in the rubber stock is obtained.

The invention is suitable for use in formation of rubber articles wherever high tear resistance is desirable or necessary. However, it is particularly useful in connection with the formation of thin sheets which will be subjected to tearing stresses imposed by the hands of users, typically sheets about 10 to 200 mils in thickness. The invention is especially useful in preparing rubber compositions to be made into foundation garments such as stretch girdles, pants or the like. In such operations, the modification of the rubber stock with a rubber-immiscible liquid does not adversely effect the established handling and fabricating procedures including milling, calendering or flocking of formed sheets or the like.

I claim:
1. In a foundation garment, selected from the group consisting of stretch girdles and pants, a molded flexible, stretchable sheet of vulcanized rubber composition comprising:
   (A) vulcanized natural crepe rubber,
   (B) about 25 to 100 parts of filler per 100 parts of crepe rubber,
   (C) about 1 to 10 parts of gelatin per 100 parts of rubber, and
   (D) about 15 to 30 parts of liquid polyol selected from the group consisting of ethylene glycol and glycerol per 100 parts of crepe rubber, the polyol being dispersed as minute discrete particles throughout the vulcanized rubber composition,
   (E) said vulcanized sheet being capable of withstanding high tearing stresses applied thereto during usage of the garment due to the high tear resistance possessed by the vulcanized rubber composition as defined.

2. A rubber composition for use in the formation of vulcanized flexible, stretchable rubber sheets of high tear resistance comprising:
   (A) natural crepe rubber,
   (B) a polyol selected from the group consisting of ethylene glycol and glycerol uniformly dispersed in the composition as minute discrete droplets in an amount of about 15 to 30 parts per 100 parts of crepe rubber,
   (C) about 1 to 10 parts of gelatin per 100 parts of rubber, and
   (D) about 0.1 to 5 parts of a soap of ammonia and a fatty acid per 100 parts of crepe rubber.

3. A method of increasing the tear resistance of vulcanizable rubber stock for use in forming stretchable foundation garments which comprises:
   (A) mixing a C12–C18 fatty acid with a rubber composition comprising as a principal ingredient an elastomeric diene polymer selected from the group consisting of polyisoprene, polybutadiene and rubbery butadiene-styrene polymers, said fatty acid being used in an amount about 1 to 5 parts per 100 parts of the composition,
   (B) forming a paste by mixing together about 15 to 30 parts of a liquid polyol selected from the group consisting of ethylene glycol and glycerol with about 5 to 10 parts of gelatin and about 0.1 to 1 part of ammonia, and (C) working the paste into the fatty acid-rubber composition until a uniform dispersion of minute discrete droplets of liquid polyol in the rubber composition is obtained.

4. A rubber composition which may be vulcanized into flexible, stretchable foundation garments having high tear resistance containing a major proportion of natural crepe rubber and comprising the following additional materials in the parts by weight indicated per hundred parts of the rubber:

(A) 16.7 parts glycerol
(B) 5.6 parts gelatine
(C) 5 parts zinc oxide
(D) 25 parts calcium silicate, said glycerine being present in the composition as a homogeneous dispersion of minute droplets.

References Cited by the Examiner

UNITED STATES PATENTS

| | | | |
|---|---|---|---|
| 1,793,983 | 2/1931 | Whittelsey | 260—33.4 |
| 2,162,810 | 6/1939 | Guinzburg | 128—521 |
| 2,537,908 | 1/1951 | Pechukas | 260—33.4 |
| 2,760,946 | 8/1956 | Hillyer | 260—747 |
| 3,037,968 | 6/1962 | Cottle et al. | 260—33.4 |
| 3,185,159 | 5/1965 | Spanel | 128—521 |

OTHER REFERENCES

"Chemistry and Technology of Rubber," Davis and Blake, published by Reinhold, New York, 1937, page 747.

JOSEPH L. SCHOFER, *Primary Examiner.*

LEON J. BERCOVITZ, *Examiner.*

J. A. SEIDLECK, *Assistant Examiner.*